(12) United States Patent
Cherkashin et al.

(10) Patent No.: US 10,276,127 B2
(45) Date of Patent: Apr. 30, 2019

(54) IDENTIFYING USERS FROM SCREEN TOUCH EVENTS

(71) Applicant: Microsoft Technology Licensing, LLC, Redmond, WA (US)

(72) Inventors: Lev Cherkashin, Redmond, WA (US); John C. Gordon, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 101 days.

(21) Appl. No.: 15/446,801

(22) Filed: Mar. 1, 2017

(65) Prior Publication Data

US 2018/0254018 A1 Sep. 6, 2018

(51) Int. Cl.
*G06F 3/041* (2006.01)
*G09G 5/00* (2006.01)

(52) U.S. Cl.
CPC ............. *G09G 5/006* (2013.01); *G06F 3/041* (2013.01); *G09G 2358/00* (2013.01); *G09G 2370/16* (2013.01)

(58) Field of Classification Search
None
See application file for complete search history.

(56) References Cited

U.S. PATENT DOCUMENTS 6,211,799 B1 4/2001 Post et al.
9,143,938 B2 * 9/2015 Narendra ............... H04W 12/06
9,396,378 B2 7/2016 Holz et al.
2006/0224048 A1 * 10/2006 Devaul ................ A61B 5/0024
600/300

(Continued)

OTHER PUBLICATIONS

Nie, et al., "Wearable Biometric Authentication Based on Human Body Communication Reference", In Proceedings of IEEE 12th International Conference on Wearable and Implantable Body Sensor Networks, Jun. 9, 2015, 5 pages.

(Continued)

*Primary Examiner* — Christopher J Kohlman
(74) *Attorney, Agent, or Firm* — Alleman Hall Creasman & Tuttle LLP (57) ABSTRACT

Examples are disclosed that relate to attributing touch events on a touch-sensitive computing device to a user who performed the touch event. One example provides a computing system, comprising a touch sensor, a communication subsystem comprising a first communication mechanism integrated with the touch sensor, the first communication mechanism configured to communicate with a portable device over a first communication channel via a body-transmissible signal upon detection of a touch input, and also comprising a second communication mechanism configured to communicate with the portable device via a second communication channel. The computing device further comprises instructions executable to detect a touch input via the touch sensor, communicate information to the portable device via the body-transmissible signal using the first communication mechanism, and connect with the portable device via the second communication mechanism based upon the information communicated to the portable device via the body-transmissible signal.

20 Claims, 7 Drawing Sheets

(56) References Cited

U.S. PATENT DOCUMENTS

| | | | |
|---|---|---|---|
| 2010/0291896 A1* | 11/2010 | Corda | G06Q 20/3278 |
| | | | 455/410 |
| 2011/0227856 A1 | 9/2011 | Corroy et al. | |
| 2015/0149310 A1 | 5/2015 | He et al. | |
| 2016/0013872 A1* | 1/2016 | strand | H04B 13/005 |
| | | | 455/41.2 |
| 2016/0043812 A1* | 2/2016 | Bolin | H04B 13/005 |
| | | | 455/550.1 |
| 2016/0320905 A1 | 11/2016 | Harrison et al. | |
| 2018/0167208 A1* | 6/2018 | Le Saint | H04L 9/0844 |

OTHER PUBLICATIONS

Vu, et al., "Capacitive Touch Communication: A Technique to Input Data Through Devices' Touchscreen", In Journal of IEEE Transactions on Mobile Computing, vol. 13, Issue 1, Jan. 2013, pp. 1-16.

"Electric field communication (BAN :Body Area Network) Touch Tag hands-free authentication system", https://web-beta.archive.org/web/20120726180329/http:/www.adniss.jp/en/archives/59, Published on: Jul. 26, 2012, 3 pages.

Hessar, et al., "Enabling On-Body Transmissions with Commodity Devices", In Proceedings of ACM International Joint Conference on Pervasive and Ubiquitous Computing, Sep. 12, 2016, 12 pages.

B, et al., "A Methodology for Implementation of Smart Security system using Near Field Body Coupled Communication Technique", In International Journal of Advanced Research in Computer and Communication Engineering, vol. 5, Issue 5, May 2016, pp. 236-242.

Gaikwad, et al., "Study on Data Communication Through Human Body", In International Journal of Electronics, Communication & Instrumentation Engineering, vol. 4, issue 2, Apr. 2014, : Gaikwad, et al pages.

Kim, et al., "Transferring Data from Smartwatch to Smartphone through Mechanical Wave Propagation", In Journal of Sensors, vol. 15, Aug. 28, 2015, pp. 21394-21406.

Irving, Michael, "Body-based Transmission System keeps Passwords Secure", http://newatlas.com/fingerprint-sensor-through-body/45647/, Published on: Sep. 28, 2016, 2 pages.

"DiamondTouch", https://en.wikipedia.org/wiki/DiamondTouch, Retrieved on: Dec. 19, 2016, 5 pages.

* cited by examiner

IDENTIFYING USERS FROM SCREEN TOUCH EVENTS

BACKGROUND

Many computing devices comprise touch sensors, such as a touch-sensitive display, to allow for touch-based interactions with a graphical user interface. In some scenarios, a touch-sensitive computing device may be used by multiple users, either at the same time or at different times.

SUMMARY

Examples are disclosed that relate to attributing touch events on a touch-sensitive computing device to a user who performed the touch event. One example provides a computing system comprising a touch sensor, a communication subsystem comprising a first communication mechanism integrated with the touch sensor, the first communication mechanism configured to communicate with a portable device over a first communication channel via a body-transmissible signal upon detection of a touch input, and also comprising a second communication mechanism configured to communicate with the portable device via a second communication channel. The computing device further comprises a logic subsystem, and a data-holding subsystem comprising instructions executable by the logic subsystem to detect a touch input via the touch sensor, communicate information to the portable device via the body-transmissible signal using the first communication mechanism, and connect with the portable device via the second communication mechanism based upon the information communicated to the portable device via the body-transmissible signal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, a touch-sensitive computing device may be used by multiple users, either at the same time or at different times. To properly attribute actions performed on such computing devices to the specific users performing the actions, the computing device may utilize a logon or other authentication process at the beginning of a user session. However, such authentication methods only authenticate the user actually logging into the device, and do not attribute individual touch interactions to users. Thus, it may be difficult to attribute actions to individual users in a multi-user scenario, such as with a multi-user large format touch device, a conference room computer, etc.

Accordingly, examples are disclosed that relate to attributing detected touch events to individual users. Briefly, the disclosed examples utilize communication between a touch-sensitive display device and a personal device carried by a user via a body-transmissible signal, and also via a second communication channel, to attribute detected touches to individual users. Attributing individual touches to specific users may offer various advantages. For example, a multi-user computing device may be able to enforce security policies on a per-touch basis. Likewise, a multi-user computing device may track productivity on a per-user basis, which may facilitate the tracking of work by employees for billing and/or management purposes. The term "touch" as used herein may refer both to physical touch events and to hover events in which an object used to make a touch input (e.g. a user's finger, hand, other body part, or a held object such as a stylus) is not in physical contact with a touch-sensitive surface but is held sufficiently close to the touch-sensitive surface to be detectable by a touch sensor.

Figure 1:
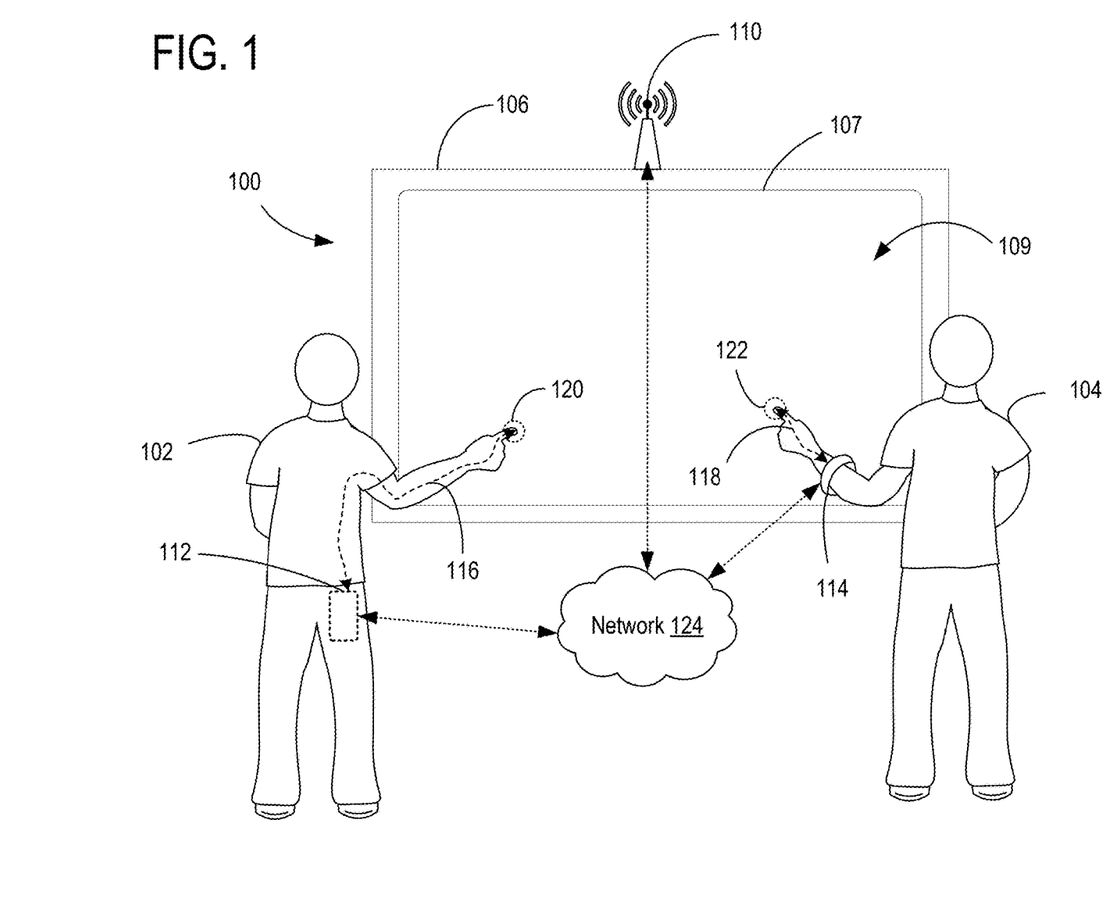
FIG. 1 shows an example scenario in which two users equipped with personal devices interact with a touch-sensitive display device.

FIG. 1 depicts an example use scenario in which users 102 and 104 are interacting with a touch-sensitive display device 106 in the form of a large-format touch-sensitive display device. The users 102 and 104 may interact with the display device 106 simultaneously, as depicted, or at different times. The display device 106 comprises a touch-sensitive display 107 having an integrated touch sensor and first communication mechanism 109. The display device 106 also comprises a wireless second communication mechanism 110, illustrated schematically as an antenna.

The first communication mechanism 109 is configured to communicate with personal devices carried by users of the touch-sensitive display device via signals transmitted via the bodies of the users 102, 104 when the users 102, 104 touch the touch-sensitive display 107. FIG. 1 schematically illustrates the touch-sensitive display device 106 communicating with the personal devices 112, 114 via body-transmissible signals 116, 118 that are transmitted and/or received at the touch-sensitive display device 106 based upon the occurrence of touch events 120, 122.

The first communication mechanism 109 may be configured to utilize any suitable type of body-transmissible signal. Examples include, but are not limited to, capacitive signals sent/received via capacitive coupling, and acoustic signals sent/received via suitable acoustic transducers, such as ultrasonic transmitters and/or receivers. The second communication mechanism 110 may be configured to communicate with the personal devices via a higher bandwidth wireless communication channel, such as via WiFi or Bluetooth wireless protocols, or via any other suitable protocol(s). The second communication mechanism 110 may utilize a network 124 for communication, or may utilize a peer-to-peer connection, in various examples.

The display device 106 is configured to detect the touch events 112, 114 via input received from the touch sensor of the touch-sensitive display, and in response trigger the output of the body-transmissible signals 116, 118 via the first communication mechanism 109. The display device 106 also may be configured to receive body-transmissible signals 116, 118 from the personal devices 112, 114. In some examples, the body-transmissible signals 116, 118 may be output from a location specific to a detected touch event for coupling into the body of a user performing the touch event. For example, where capacitive coupling is used as a body-transmissible signal, when a touch is sensed, the first communications mechanism may utilize a capacitive electrode array to charge a capacitive element corresponding to a location of a touch, and/or read the capacitive element at the location of touch to detect a body-transmissible signal sent by a personal device. In other examples, the body-transmissible signals 116, 118 may not be localized.

In the depicted embodiment, the touch events 112, 114 are depicted as single-finger touches. However, individual touches of multi-touch inputs also may be attributed to individuals in the manner described herein. Further, touches by objects other than a body part, such as touches by a stylus or dial-type device that is held in the hand of a user and placed against a touch-sensitive display, also may be used to transmit and/or receive a body-transmissible signal. While the depicted touch-sensitive display device takes the form of a large-format multi-user device, a touch-sensitive display device as described herein may take any other suitable form, such as a personal computer (PC), a laptop computer, a tablet computer, a mobile device, or a projected display (e.g. a displayed image that is projected onto a surface comprising a touch sensing mechanism (optical, capacitive, or other) and also comprising a first communications mechanism that can transmit and/or receive a body-transmissible signal).

Likewise, a personal device with which the display device 106 communicates also may take any suitable form. The depicted personal devices 112, 114 respectively take the form of a smart phone carried in the pocket of a user and a band (e.g. a watch or fitness tracker) worn on the wrist of a user. A band form factor, or other form factor that directly contacts the body, may provide better coupling with the body for sending and/or receiving body-transmissible signals, as an electrode for a capacitive coupling system or an acoustic transducer may be placed in direct contact with the skin. However, a personal device such as a smartphone also may be positioned closely enough to a person's skin to conduct body-transmissible communications, particularly if carried in a pocket or clipped to a location that positions it close to the skin. Examples of other personal devices are described in more detail below.

A body-transmissible signal may be configured to communicate any suitable information to the portable device. In some examples, the body-transmissible signals 116, 118 each may prompt a respective personal device 112, 114 to establish communications with the touch-sensitive display device over the second communication channel. Such a signal may contain a network address (e.g. an IP address) of the second communication mechanism for the touch-sensitive display device 106, and potentially other information. For example, the body-transmissible signal may include an identifier assigned to each touch input (such as a globally unique identifier), a public key of the touch-sensitive display device 106, and/or other information regarding the touch input, such as a timestamp of the touch, a pixel or zone location of the touch, and/or other information identifiable via the touch sensor of the touch-sensitive display 107.

Information received via the body-transmissible signal then may be used by the personal devices 112, 114 to send an encrypted message to the touch-sensitive computing device via the second communication channel. As a more specific example, the personal devices 112, 114 each may send a message (e.g. one or more packets) encrypted with the server's public key, wherein the packet contains the event identifier, a public key for the personal device, and a user identity claim, thereby identifying both the personal device and the user.

Upon assigning an identifier to a received touch input, the touch-sensitive display device 106 may store the as-of yet unclaimed touch event for a period of time (for example, 200-500 milliseconds), and wait for receipt of the encrypted message via the second communication mechanism 110. When an encrypted message is received via the second communication mechanism, the encrypted message is decrypted using the private key of the touch-sensitive display device 106, and the touch identifier is mapped to the user identity contained in the encrypted message. The personal device public key then may be used to issue an authentication challenge to the personal display device.

Any suitable challenge model may be used for such an authentication challenge. In some examples, the challenge model may be fully local, with no use of a trusted authority. In some such examples, the personal device may simply provide all of the information used to verify the user to the display device over either the first communication channel or the second communication channel. In other examples, the personal device may present a claim or identity digest to the shared device, e.g. over the second communication channel. Such a claim may not be sufficient to authenticate the user, but is sufficient for basic identification purposes. The display device may then validate the claim using an additional authentication mechanism (e.g. such as a second device authentication model (e.g. using the user's smartphone), a biometric model, or other suitable authentication process). In other examples, a trusted authority, such as a Kerberos or SAMLv3, may be used to perform user authentication. In such examples, the claim or ticket-granting ticket may be sent from the personal device to the shared device over the second communication channel, or the challenge may be deferred to a separate authority trusted by both devices (e.g. a Kerberos server). The operating system may then associate that identity with the originating application or system interaction to further augment the set of credentials available to the application or system context that handled the touch input event to satisfy credential challenges to access resources or interact with remote services. The authentication challenge may be sent via the second communication mechanism, or a different communication mechanism than the first communication mechanism or the second communication mechanism (e.g. as specified by the personal device via data contained in the encrypted message. Further, in some instances (such as where a user is merely alerting a device of the user's presence, rather than accessing resources, such an authentication challenge may be omitted, and the display device may use the identification provided by the personal device without authentication.

Once the personal device has been authenticated, the touch-sensitive display device may send a message to the personal device with instructions regarding a low-latency pingback connection for labeling subsequent touch events. The pingback tagging connection may utilize the same physical medium, or a different physical medium, from the claim negotiation and initial discovery channels. As one example, each personal device 112, 114 may be configured to output a capacitive or acoustic signal at a frequency that is either predetermined for that personal device (in which case the personal device may inform the touch-sensitive display device of the frequency), or that is assigned to that personal device 112, 114 by the touch-sensitive display device 106. In some examples, the frequencies may be different for different personal devices 112, 114 to provide for more certain disambiguation. Then, the touch-sensitive display device 106 may detect the capacitive or acoustic signal for the respective personal-devices each time a touch input is received, thereby allowing touch inputs made subsequent to the initial discovery and authentication processes to be assigned to a correct user identity directly through each touch event based upon the frequency of the signal received via the touch input.

As another example, the touch-sensitive display device 106 may continuously or intermittently output a body-transmissible signal over the first communication channel. Thus, when a user touches the touch-sensitive display 107, the personal device may detect the touch event via the first communication mechanism 109, and then in response emit an event over a higher bandwidth, lower latency channel (which may be the same as or different than the second communication channel used by the second communication mechanism 110) to allow the touch event to be tagged based upon temporal proximity to the touch event. It will be understood that these methods of tagging subsequent touch events with user identities are presented for the purpose of example, and that other methods of tagging subsequent touch events with user identities also may be used.

In this manner, the touch-sensitive display device 106 may the attribute touch events 120, 122 respectively to users 102, 104. This may allow different security policies to be applied to each user, may allow edits to collaborative work to be attributed specifically to the author of those edits, may allow productivity to be individually tracked in multi-user collaborative scenarios, and/or may provide other advantages. While described above in the context of a multi-user scenario, touch attribution also may be used to authenticate users of other computing devices, such as a desktop or laptop computers used in shared environments. Further, touch attribution may be used as a convenient login operation, wherein a user carrying a suitable personal device may simply touch a touch sensor (whether or coextensive with a display) to login to a computing system.

In the examples described above, the body-transmissible signals 116, 118 used to initiate the connection between the personal devices 112, 114 and the touch-sensitive display device 106 are sent from the touch-sensitive display device 106 to the personal devices 112, 114. In other examples, the body-transmissible signals 116, 118 may be sent from the personal devices 112, 114 to the touch-sensitive display device 106 for initiating the connection. For example, each personal device 116, 118 may be configured to send a network address of the personal device to the display device 106 over the first communication channel after receiving an initial communication from the display device 106 over the first communication channel, and the display device 106 may then initiate connection with the personal device over the second communication channel based upon the address provided. In yet other examples, a personal device 114, 116 may send a beacon signal (either continuously or intermittently) via a body-transmissible signal for detection by the touch-sensitive display device when a user of the personal device makes a touch input. In any of these examples, once the initial discovery is accomplished, authentication may be performed in a similar manner as described above.

Figure 2:
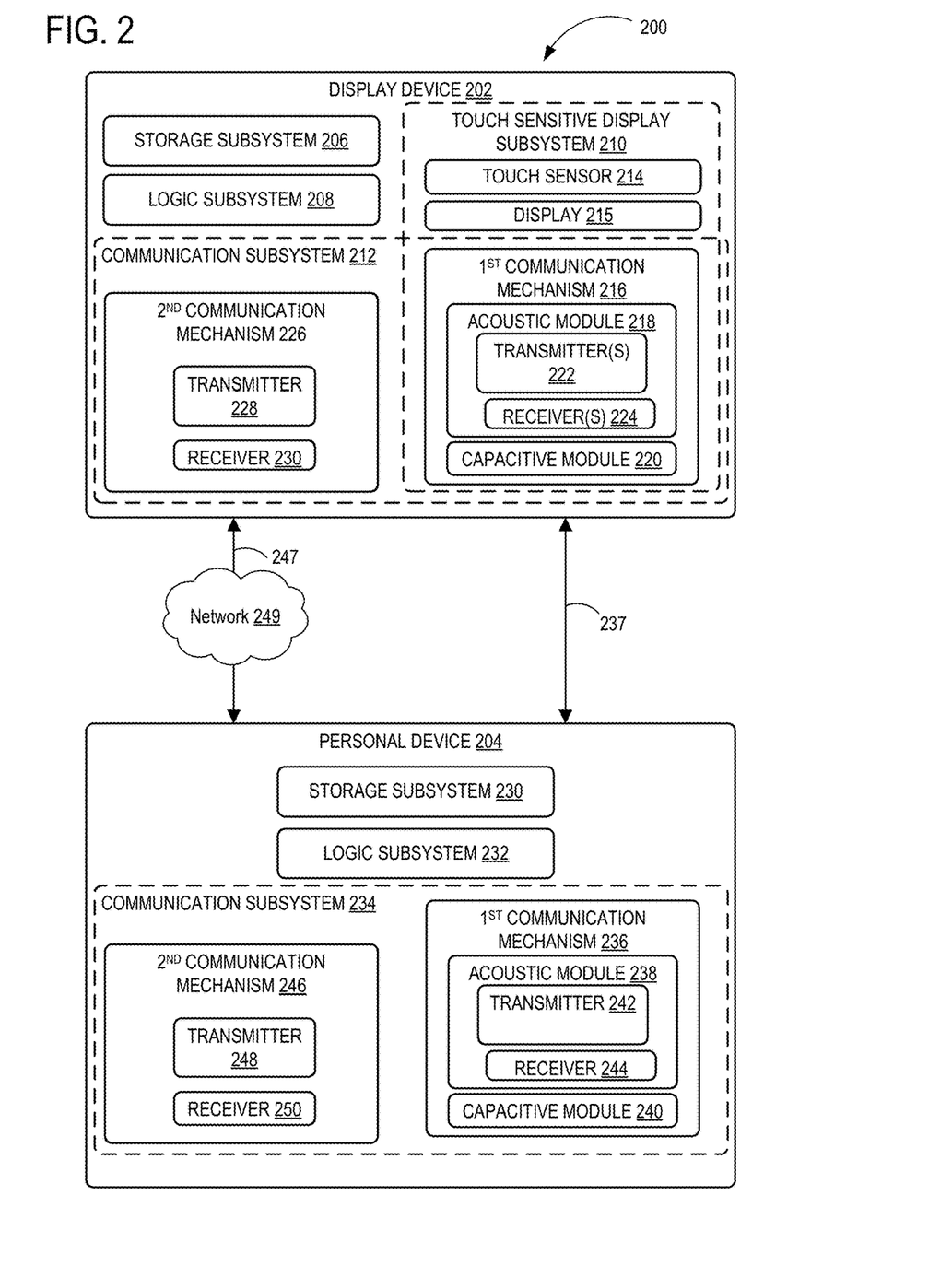
FIG. 2 shows a block diagram illustrating an example touch-sensitive display device and an example personal device.

FIG. 2 shows a block diagram illustrating an example touch-sensitive display device 202 and an example personal device 204. The display device 202 may represent display device 106 of FIG. 1, for example, and the personal device 204 may represent personal devices 112, 114. The display device 202 comprises a storage subsystem 206 configured to store executable instructions, and a logic subsystem 208 configured to execute instructions stored by the storage subsystem 206. Instructions stored in the storage subsystem 206 are executable to control a touch-sensitive display subsystem 210 and a communication subsystem 212, as well as other possible components not shown here. More detailed examples of computing hardware configurations are described in more detail below.

The touch-sensitive display system further comprises a touch sensor 214 and a display 215 to form a touch-sensitive display to allow touch interactions with a graphical user interface. The touch-sensitive display subsystem 210 also incorporates a first communication mechanism 216 of the communication subsystem. As described above, the first communication mechanism 216 is configured to conduct communications with personal device 204 via a body-transmissible signal. As such, the first communication mechanism may include any suitable hardware for conducting such communications. Examples include an acoustic communication module 218 and a capacitive communication module 220. Note that either of these modules may be included alone, or both may be included, in various examples. Where both are included, the display device 202 may comprise instructions executable to help determine which communication module to use in various instances, for example, based upon a strength of a signal received from a personal device via each module.

Where included, the acoustic communication module 218 may comprise any suitable hardware for sending and/or receiving acoustic body-transmissible signals. For example, in the case of larger-format, multi-user displays, the acoustic communications module may comprise one or more acoustic transmitters 222 (e.g. speakers, high-frequency vibratory motors, etc.) and/or one or more acoustic receivers 224 (e.g. microphones, etc.). In some examples, a plurality of transmitters and/or receivers may be used, wherein each transmitter and/or receiver is associated with an area of the touch sensor 214 and the display 215. Thus, a selected transmitter 222 and/or receiver 224 may be used to conduct communications in an area in which a touch is detected. As a more specific example, in a large format display, each acoustic transducer may be associated with a specified sub-region of the display. Likewise, for a smaller format device that is likely to be used by a single user at a time, a single acoustic transducer (or group of transducers) may be used for the entire touch sensor and display area. The acoustic module 218 may be configured to transmit and/or receive an acoustic signal of any suitable frequency, including ultrasound frequencies.

Where included, the capacitive communication module 220 may comprise any suitable hardware for sending and/or receiving capacitive-coupled body-transmissible signals. In some examples, the capacitive communication module 220 may comprise an array of column and row electrodes similar to but separate from an array of electrodes used for touch sensing. This electrode array may be positioned at any suitable location relative to the touch sensing electrodes, such as between the display 215 and the touch sensor 214, or on an opposite side of the touch sensor 214 as the display 215. Further, in some implementations, a same electrode array may be used for both touch sensing and communication via body-transmissible signals. In such an example, the scanning frequency may be modulated between a touch sensing frequency and a first communication channel frequency.

The communication subsystem 212 further includes a second communication mechanism 226. As described above, the second communication mechanism 226 is configured to connect to the personal device 204 wirelessly based upon information exchanged via the first communication mechanism using a body-transmissible signal. The second communication mechanism may utilize any suitable communications protocols, such as WiFi and Bluetooth protocols.

The personal device 204 may represent either of personal devices 112, 114 of FIG. 1, as examples, or may take any other suitable form. The personal device 204 may be a device that is not intended to be shared among different users, but rather to be personal to the user carrying the personal device 204. The personal device 204 comprises a storage subsystem 230, a logic subsystem 232, a communication subsystem 234 and a touch-sensitive display subsystem 236, wherein instructions stored in the storage subsystem 230 are executable to control a communication subsystem 234. Personal device 204 further may include other components, such as a touch-sensitive display, motion sensor(s), image sensor(s), speaker(s), and microphone(s), depending upon a particular form factor of the personal device.

The communication subsystem comprises a first communication mechanism 236 configured to conduct communications with display device 202 via the body-transmissible signal over a first communication channel 237, and may include any suitable hardware for conducting such communications. Examples include an acoustic communication module 238 and a capacitive communication module 240. As described above with regard to the touch-sensitive display device, either of these modules may be included alone, or both may be included in various examples. Where both are included, the personal device 204 may comprise logic to help determine which communication module to use in various instances, for example, based upon a strength of a signal received from the display device via each module.

The acoustic communication module 238 and/or the capacitive communication module 240 each may comprise any suitable hardware for sending and/or receiving acoustic body-transmissible signals. For example, the acoustic communication module may comprise an acoustic transmitter 242 and/or an acoustic receiver 244 placed on the device to be in contact with or in close proximity to the body of a user. Likewise, the capacitive communication module 240 may include an electrode configured to be positioned against, or in close proximity to, a body of a user. In examples where the personal device takes the form of a wearable device, these transmitters and/or receivers may be positioned on a skin-contacting surface of the personal device. As more specific examples, acoustic and/or capacitive transmitters and/or receivers may be located on a wrist-contacting surface of a band or smart watch computing device, or on a head-contacting surface of a head-mounted display device. In the case of a smartphone, an existing microphone and/or touch sensor may be used respectively for acoustic and/or capacitive coupled communications, or dedicated acoustic and/or capacitive transmitters and receivers may be included in the smartphone in addition to a standard microphone and touch sensor.

The communication subsystem 234 further includes a second communication mechanism 246. As described above, the second communication mechanism 246 is configured to connect to display device 202 wirelessly over a second communication channel 247 based upon information exchanged via the first communication mechanism using a body-transmissible signal. The second communication channel may utilize any suitable network-based or peer-to-peer communications protocol, such as a WiFi or Bluetooth protocol. As such, in some examples the second communication channel may use an intermediate network 249, while in other examples, the second communication channel may comprise a peer-to-peer connection between the touch-sensitive display device 202 and the personal device 204.

Figure 3A:
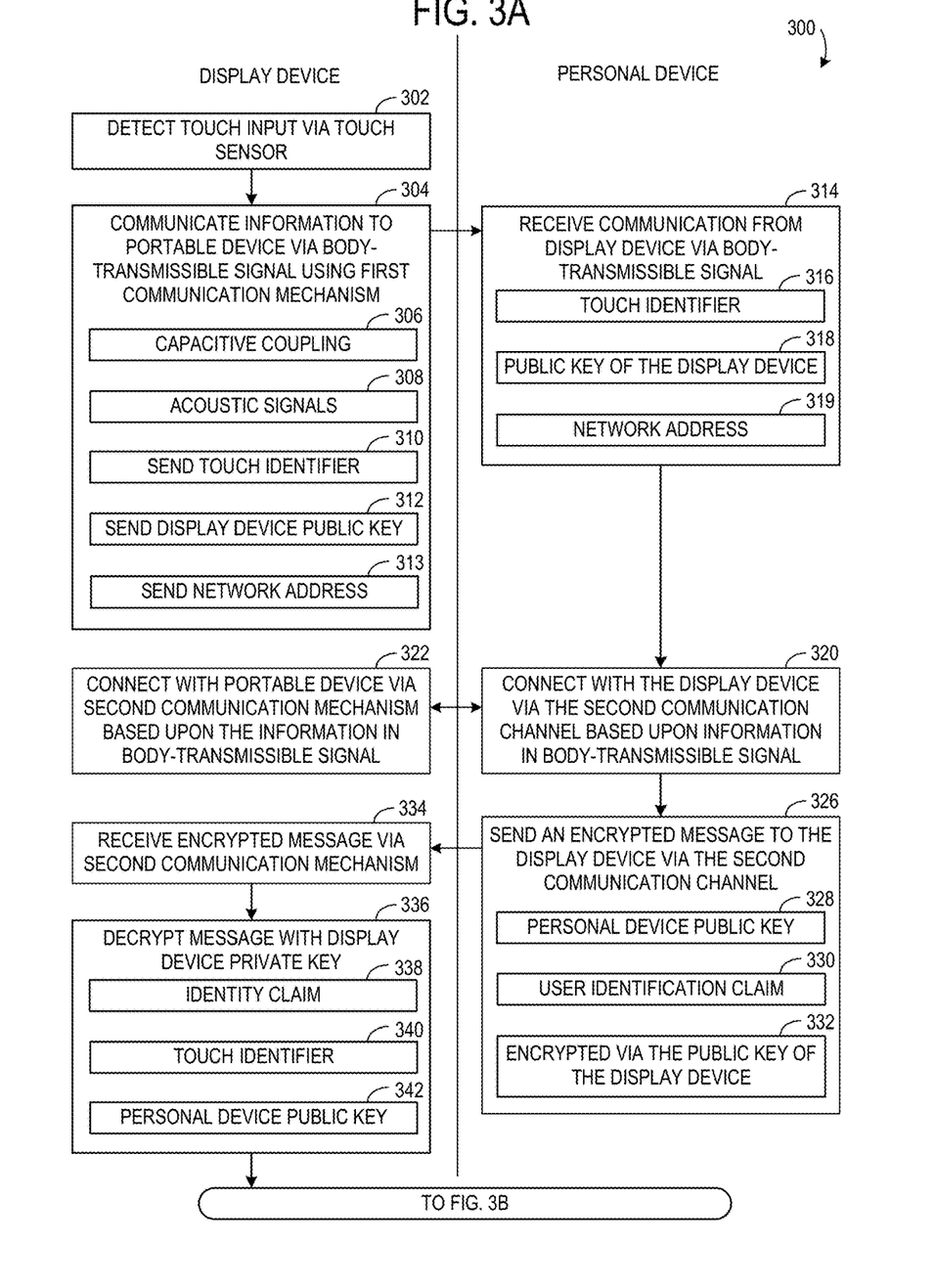
FIGS. 3A-3B show a flow diagram depicting an example method of attributing a touch input to an identified user.
Figure 3B:
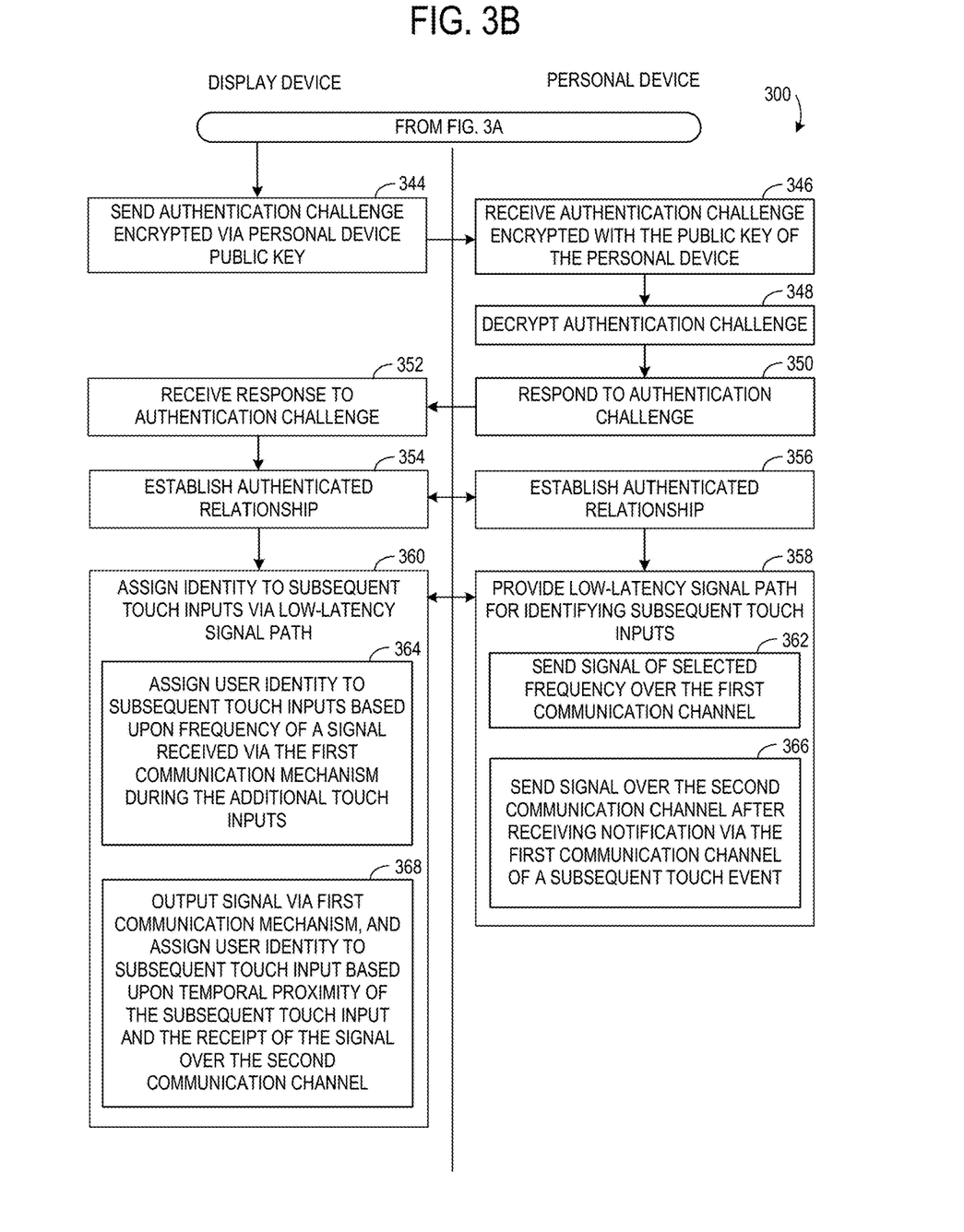

FIGS. 3A-3B show a flow diagram depicting an example method 300 of attributing a touch event to an identified user. Method 300 illustrates processes performed both on a touch-sensitive display device and also a personal device carried by a user of the touch-sensitive display device. Method 300 may be implemented, for example, by the display devices and personal devices of FIGS. 1 and 2.

Method 300 comprises, at 302, detecting a touch input at the touch-sensitive display device via a touch sensor, which may be coextensive with a display to form a touch-sensitive display. At 304, method 300 comprises, upon detecting the touch input, communicating information to the portable device via a body-transmissible signal using a first communication mechanism. The first communication mechanism may utilize capacitive coupling 306, acoustic signals 308, and/or any other suitable body-transmissible signal. Any suitable information may be sent via the body-coupled signal. Examples include, but are not limited to, a touch identifier (e.g. a globally unique ID assigned by the display device) 310, a public key 312 of the touch-sensitive display device, and/or a network address 313 of a second communication mechanism of the touch-sensitive display device.

At 314, the personal device receives the communication from the display device via the body-transmissible signal. Receiving the communication may comprise receiving the touch identifier 316, the public key 318, and/or the network address 319 of the second communication mechanism of the touch-sensitive display device. Using the information received in the body-transmissible signal, the personal device connects with the touch-sensitive display device, as indicated at 320 and 322.

Continuing, at 326, the portable display device sends an encrypted message to the touch-sensitive display device via the second communication channel. The encrypted message may take any suitable form. As one example, the encrypted message may take the form of one or more packets of information containing a personal device public key 328 and a user identification claim 330. The encrypted message may be encrypted via the public key of the touch-sensitive display device 332, or in any other suitable manner.

At 334, the touch-sensitive display device receives the encrypted message via the second communication mechanism, and at 336 decrypts the message using the private key of the touch-sensitive display device. The touch-sensitive display device may receive any suitable information in the message. For example, as mentioned above, the touch-sensitive display device may receive a user identity claim 338, touch identifier 340, and personal device public key 342.

With the user identity claim, the touch-sensitive display device may attribute the detected touch input to the user identified in the identity claim. Further, in some examples, the touch-sensitive display device may authenticate the personal device and the user identity by sending, at 344, an authentication challenge to the personal device. The authentication challenge may comprise, for example, a message encrypted via the public key of the personal device. At 346, the personal device receives the identity challenge, at 348 decrypts the identity challenge, and at 350 responds to the identity challenge. The touch-sensitive display device receives the response to the authentication challenge at 352, and if the response is correct, establishes an authenticated relationship with the personal device, as indicated at 354 and 356.

After establishing an authenticated relationship, the touch-sensitive display device and the personal device may establish a low-latency signal path for identifying subsequent touch inputs. This is depicted in FIG. 3B as the personal device providing a low-latency signal for identifying such subsequent touch inputs at 358, and the touch-sensitive display device assigning the identity of the authenticated user to subsequent detected touch inputs via the low-latency signal path at 360. Any suitable low-latency signal path may be used. As one example, upon establishing the authenticated relationship, the personal device may output a signal at a selected, identifiable frequency over the first communication channel, as indicated at 362. Such signal may take comprise an electrical signal for capacitive coupling, an acoustic signal, or any other suitable signal. Then, when the user subsequently touches the touch sensor of the touch-sensitive display device, the touch-sensitive display device may identify the user from the frequency of the signal, and assign the user identity to the subsequent touch, as indicated at 364.

As another example, upon establishing the authenticated relationship, the personal device may monitor the first communication channel for a signal notifying that the user has touched the display, as indicated at 366, and then send a signal over the second communication channel within a threshold time after receiving the notification. In this manner, the touch-sensitive display device may assign the user identity to the subsequent touch based upon a temporal proximity to the detected touch and the receipt of the signal over the second communication channel, as indicated at 368. The touch-sensitive display device may provide any suitable signal to the personal device to signify a touch. Examples range from a single bit of information (e.g. indicating that a touch occurred) to more detailed information about the touch, such as a touch location and/or time stamp. Such more detailed information may then be returned to the touch-sensitive display device in the message sent over the second communication channel to help confirm the identity of the user that performed the subsequent touch.

While described herein in the context of identifying a single user of a touch-sensitive display, method 300 may be performed for each user of a multi-user system to allow touch inputs to be attributed to individual users of the multi-user system. Where two or more users are using a multi-user system simultaneously, temporal proximity of touch inputs compared to the receipt of messages over the second channel, and/or different frequency signals provided via the first communication channel, may help to distinguish different users from one another.

Figure 4:
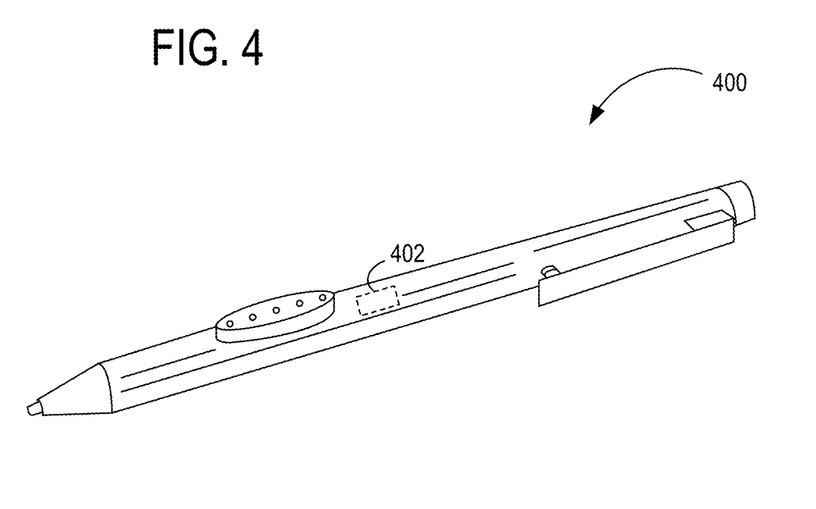
FIG. 4 shows an example personal device in the form of a stylus.

In FIG. 1, the example personal devices 112, 114 are depicted as taking the respective forms of a smart phone and a wearable band, such as a watch or fitness tracker. However, a personal device may take any other suitable form. FIG. 4 depicts another example of a personal device 400 in the form of a stylus. The personal device 400 may be worn or suspended near the body of the user, attached to clothing, or even held by the user and touched directly on the display device to make a touch input. Where the personal device 400 is touched directly on the display device, the first communication channel may be formed directly between the personal device 400 and the display device, rather than passing through the body. Likewise, where the personal device 400 is worn or suspended near the body of the user, the first communication channel may pass through the body of the user. A transmitter and/or receiver (e.g. an audio transducer and/or capacitive plate, shown schematically at 402) for the first communication channel may be located at any suitable position on the personal device 400. Examples include, but are not limited to, portions of the personal device 400 intended to be gripped during use, as such portions also may be located close to the body when carried in a pocket or clipped to clothing. In additional to a stylus, a personal device may take the form of any other suitable hardware device intended for touch inputs, such as a dial configured to be placed in contact with a touch-sensitive display for dial inputs.

Figure 5:
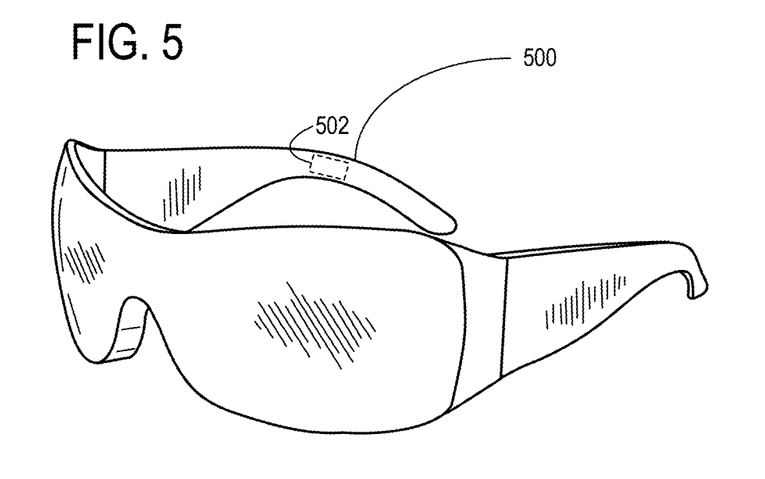
FIG. 5 shows an example personal device in the form of a head-mounted display.
Figure 6:
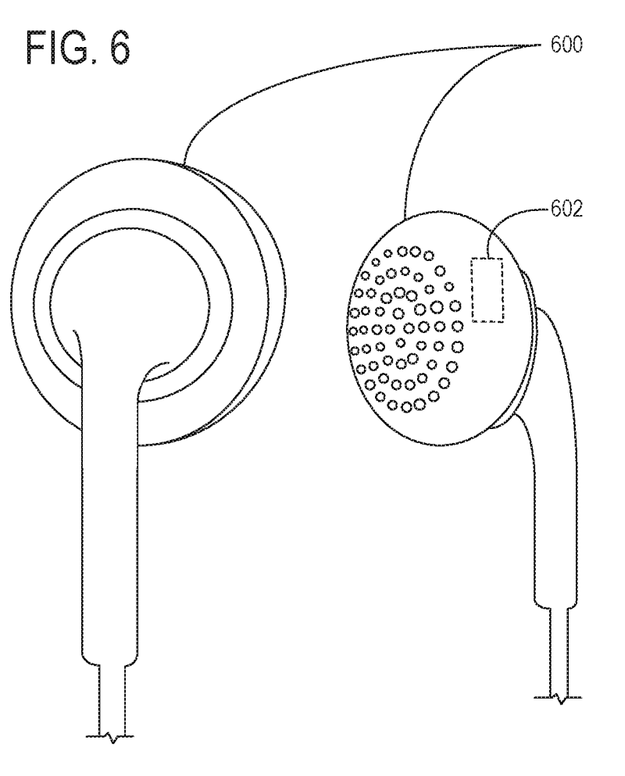
FIG. 6 shows an example personal device in the form of a pair of earbuds.

FIG. 5 depicts an example of a personal device in the form of a head-mounted device 500. The head-mounted device 500 may represent an augmented reality display device, a virtual reality display device, or a pair of glasses, sunglasses or other visual aid. A transmitter and/or receiver (shown schematically at 502) for the first communication channel may be located at any suitable position on the personal device 500. Examples include, but are not limited to, portions of the head-mounted device 500 that contact a user's skin, such as at the earpiece or bridge of nose. A personal device further may take the form of another wearable device, such as a hat, band, necklace, or other device worn on the body or suspended suitably near the body, such as earbuds 600 shown in FIG. 6 or a pair of headphones intended to be worn over the ear. A first communication mechanism is illustrated schematically at 602. Additionally, a personal device also may take the form of clothing having computing functionality built in. For example, the first communication mechanism may be at least partially implemented via electrically conductive fibers included in the clothing.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
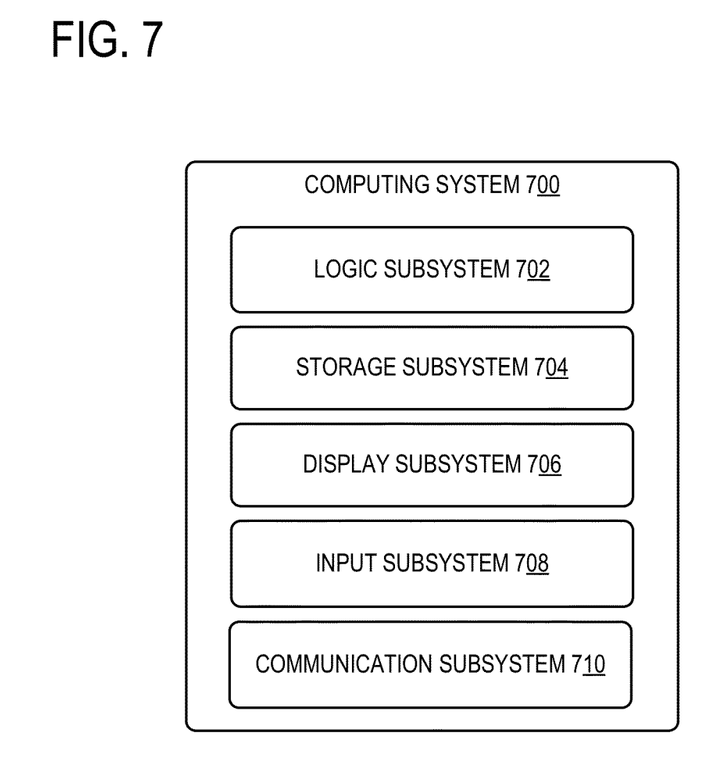
FIG. 7 shows a block diagram of an example computing device.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. Computing system 700 may represent any of the computing systems and devices shown in FIGS. 1-2 and 4-6.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 704 includes one or more physical devices configured to hold instructions executable by the logic subsystem to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage subsystem 704. This visual representation may take the form of a graphical user interface (GUI). As the herein described methods and processes change the data held by the storage subsystem, and thus transform the state of the storage subsystem, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a computing system, comprising a touch sensor; a communication subsystem comprising a first communication mechanism integrated with the touch sensor, the first communication mechanism configured to communicate with a portable device over a first communication channel via a body-transmissible signal upon detection of a touch input, and a second communication mechanism configured to communicate with the portable device via a second communication channel; a logic subsystem; and a data-holding subsystem comprising instructions executable by the logic subsystem to detect a touch input via the touch sensor, communicate information to the portable device via the body-transmissible signal using the first communication mechanism, and connect with the portable device via the second communication mechanism based upon the information communicated to the portable device via the body-transmissible signal. In some such examples, the touch sensor and the first communication mechanism may alternatively or additionally be integrated into a touch-sensitive display. In some such examples, the first communication mechanism may alternatively or additionally be configured to communicate with the personal device via capacitive coupling. In some such examples, the first communication mechanism alternatively or additionally may be configured to communicate via acoustic signals. In some such examples, the second communication channel comprises a wireless communication channel with higher bandwidth than the first communication channel. In some such examples, the instructions executable to communicate information to the portable device via the body-transmissible signal using the first communication mechanism alternatively or additionally may be executable to send a touch identifier for the touch input detected and also a public key of the computing system via the first communication channel. In some such examples, the computing system may alternatively or additionally comprise instructions executable to receive an encrypted message via the second communication channel, decrypt the message via a private key of the computing system, and assign a user identity to the touch event detected. In some such examples, the computing system alternatively or additionally may further comprise assigning the user identity to a subsequent touch input based upon a frequency of a signal received via the first communications mechanism during the subsequent touch input. In some such examples, the computing device alternatively or additionally may comprise instructions executable to assign the user identity to a subsequent touch input based upon a temporal proximity of the subsequent touch input and a receipt of the signal over the second communication channel.

Another example provides a computing device, comprising a touch sensor comprising a first communication mechanism, the first communication mechanism configured to communicate with a display device via a first communication channel via a body-transmissible signal when the display device is touched by the user; a second communication mechanism configured to communicate with the display device via a second communication channel; a logic subsystem; and a data-holding subsystem comprising computer-readable instructions executable by the logic subsystem to receive a communication at the first communication mechanism via the body-transmissible signal from the display device, and connect with the display device via the second communication channel based upon the information communicated to the display device via the body-transmissible signal. In some such examples, the computing device may comprise a wearable device or a smart phone. In some such examples, the instructions executable to receive the communication via the first communication channel alternatively or additionally are executable to receive a touch identifier and also a public key of the display device via the first communication channel. In some such examples, the computing device alternatively or additionally comprises instructions executable to send an encrypted message to the display device via the second communication channel, the encrypted message comprising a public key of the computing system and a user identification claim, and the encrypted message being encrypted via the public key of the display device. In some such examples, the computing system alternatively or additionally comprises instructions executable to receive an authentication challenge from the display device that is encrypted with the public key of the computing device, decrypt the authentication challenge, and respond to the authentication challenge to establish an authenticated relationship with the display device. In some such examples, the computing device alternatively or additionally comprises instructions executable to send a signal of a selected frequency over the first communication channel after establishing the authenticated relationship with the display device. In some such examples, the computing device alternatively or additionally comprises instructions executable to, after establishing the authenticated relationship with the display device, send a signal over the second communication channel after receiving notification via the first communication channel of a subsequent touch event. In some such examples, the computing device alternatively or additionally may be configured to receive the body-transmissible signal in the form of an acoustic signal or a capacitive-coupled signal.

Another example provides, on a computing device, a method for associating touch events on a touch-sensitive display with an identification of a user, the method comprising receiving at a touch sensor a touch input, sending information to a portable device via a body-transmissible signal using a first communication mechanism located adjacent to or integrated with the touch sensor, the information comprising a public key of the computing device, receiving an encrypted message from the portable device over a second communication channel, decrypting the encrypted message using a private key of the computing device, and assigning a user identity to the touch input based upon an identity received in the encrypted message. In some such examples, the method alternatively or additionally may comprise assigning the user identity to a subsequent touch input based upon a frequency of a signal received via the first communications mechanism during the subsequent touch input. In some such examples, the method may alternatively or additionally comprise assigning the user identity to a subsequent touch input based upon a temporal proximity of a receipt of a signal over the second communication channel to the subsequent touch input.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a touch sensor;
a communication subsystem comprising
a first communication mechanism integrated with the touch sensor, the first communication mechanism configured to communicate with a portable device over a first communication channel via a body-transmissible signal upon detection of a touch input, and
a second communication mechanism configured to communicate with the portable device via a second communication channel;
a logic subsystem; and
a data-holding subsystem comprising instructions executable by the logic subsystem to
detect a touch input via the touch sensor;
communicate information regarding the touch input to the portable device via the body-transmissible signal using the first communication mechanism;
connect with the portable device via the second communication mechanism based upon the information communicated to the portable device via the body-transmissible signal;
receive from the portable device via the second communication mechanism an identity of a user; and
assign the identity of the user to the touch input.

2. The computing system of claim 1, wherein the touch sensor and the first communication mechanism are integrated into a touch-sensitive display.

3. The computing system of claim 1, wherein the first communication mechanism is configured to communicate with the personal device via capacitive coupling.

4. The computing system of claim 1, wherein the first communication mechanism is configured to communicate via acoustic signals.

5. The computing system of claim 1, wherein the second communication channel comprises a wireless communication channel with higher bandwidth than the first communication channel.

6. The computing system of claim 1, wherein the instructions executable to communicate information to the portable device via the body-transmissible signal using the first communication mechanism are executable to send a touch identifier for the touch input detected and also a public key of the computing system via the first communication channel.

7. The computing system of claim 6, further comprising instructions executable to receive an encrypted message including the user identity via the second communication channel, and decrypt the message via a private key of the computing system.

8. The computing system of claim 7, further comprising instructions executable to assign the user identity to a subsequent touch input based upon a frequency of a signal received via the first communications mechanism during the subsequent touch input.

9. The computing system of claim 7, further comprising instructions executable to assign the user identity to a subsequent touch input based upon a temporal proximity of the subsequent touch input and a receipt of the signal over the second communication channel.

10. A computing device, comprising:
a touch sensor comprising a first communication mechanism, the first communication mechanism configured to communicate with a display device via a first communication channel via a body-transmissible signal when the display device is touched by the user;
a second communication mechanism configured to communicate with the display device via a second communication channel;
a logic subsystem; and
a data-holding subsystem comprising computer-readable instructions executable by the logic subsystem to
receive a communication at the first communication mechanism via the body-transmissible signal from the display device regarding a touch input detected at the display device; and
connect with the display device via the second communication channel based upon the communication received via the body-transmissible signal; and
transmit to the display device via the second communication channel an identity of a user.

11. The computing device of claim 10, wherein the computing device comprises a wearable device or a smart phone.

12. The computing device of claim 10, wherein the instructions executable to receive the communication via the first communication channel are executable to receive a touch identifier and also a public key of the display device via the first communication channel.

13. The computing device of claim 12, further comprising instructions executable to send an encrypted message to the display device via the second communication channel, the encrypted message comprising a public key of the computing system and a user identification claim, and the encrypted message being encrypted via the public key of the display device.

14. The computing device of claim 13, further comprising instructions executable to receive an authentication challenge from the display device that is encrypted with the public key of the computing device, decrypt the authentication challenge, and respond to the authentication challenge to establish an authenticated relationship with the display device.

15. The computing device of claim 14, further comprising instructions executable to send a signal of a selected frequency over the first communication channel after establishing the authenticated relationship with the display device.

16. The computing device of claim 14, further comprising instructions executable to, after establishing the authenticated relationship with the display device, send a signal over the second communication channel after receiving notification via the first communication channel of a subsequent touch event.

17. The computing device of claim 10, wherein the computing device is configured to receive the body-transmissible signal in the form of an acoustic signal or a capacitive-coupled signal.

18. On a computing device, a method for associating touch events on a touch-sensitive display with an identification of a user, the method comprising:
receiving at a touch sensor a touch input;
sending information to a portable device via a body-transmissible signal using a first communication mechanism located adjacent to or integrated with the touch sensor, the information comprising a public key of the computing device;
receiving an encrypted message from the portable device over a second communication channel;
decrypting the encrypted message using a private key of the computing device; and
assigning a user identity to the touch input based upon an identity received in the encrypted message.

19. The method of claim 18, further comprising assigning the user identity to a subsequent touch input based upon a frequency of a signal received via the first communications mechanism during the subsequent touch input.

20. The method of claim 18, further comprising assigning the user identity to a subsequent touch input based upon a temporal proximity of a receipt of a signal over the second communication channel to the subsequent touch input.

* * * * *